United States Patent [19]
Ford

[11] 3,981,282
[45] Sept. 21, 1976

[54] IGNITION SYSTEMS AND FUEL INJECTION SYSTEMS FOR INTERNAL COMBUSTION ENGINES

[75] Inventor: Eric Harold Ford, London, England

[73] Assignee: Lumenition Limited, England

[22] Filed: Jan. 8, 1973

[21] Appl. No.: 321,660

[30] Foreign Application Priority Data
Jan. 18, 1972 United Kingdom............... 2311/72

[52] U.S. Cl..................... 123/117 R; 235/151.21; 328/55
[51] Int. Cl............................ F02p 5/04; F02p 1/00
[58] Field of Search........ 123/148 E, 32 CA, 117 R; 235/151.21; 328/55

[56] References Cited
UNITED STATES PATENTS

| 3,646,926 | 3/1972 | Plume | 123/148 E |
|---|---|---|---|
| 3,696,303 | 10/1972 | Hartig | 123/148 E |
| 3,738,339 | 6/1973 | Huntzinger | 123/148 E |
| 3,749,073 | 7/1973 | Asplund | 123/148 E |
| 3,757,755 | 9/1973 | Carner | 123/148 E |
| 3,809,029 | 5/1974 | Wakamatsu | 123/148 E |
| 3,871,342 | 3/1975 | Fujinami | 123/148 E |

Primary Examiner—Charles J. Myhre
Assistant Examiner—Ronald B. Cox
Attorney, Agent, or Firm—Larson, Taylor and Hinds

[57] ABSTRACT

The advance and retard of the spark ignition in an ignition system of an internal combustion engine is achieved electronically by generating two series of pulses in synchronism with the engine using one series as a reference for maximum advance and the other series to operate a counter to count down the requisite number of pulses beyond the maximum advance point before the spark is initiated, the count of the counter being varied from a computer in accordance with speed and/or load on the engine.

10 Claims, 6 Drawing Figures

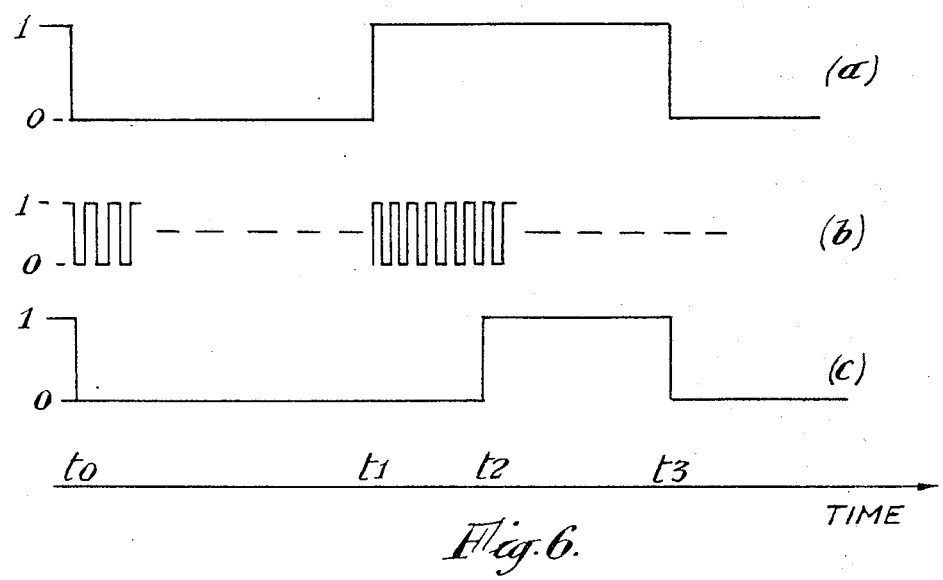

IGNITION SYSTEMS AND FUEL INJECTION SYSTEMS FOR INTERNAL COMBUSTION ENGINES

The present invention relates to both spark ignition systems for internal combustion engines.

One such spark ignition system is disclosed in my Pat. No. 3,605,712. This prior art system employs the principle of fast inverse switching a signal produced by a beam of infra-red radiation which is chopped in synchronism with the engine revolutions. The advance and retard of the spark was achieved by utilizing the vacuum principle in accordance with speed or load. This known method of achieving accurate control of the spark ignition timing relied on mechanical devices such as spring biased diaphragms, and whilst perfectly satisfactory they are liable to failure or misadjustment.

It is therefore an object of the present invention to utilize an electronic system for the control of the ignition system of an internal combustion engine in accordance with engine requirements, whereby the ignition system is substantially free from mechanical defects.

According to the present invention there is provided an electronic device for controlling the advance and retard of the ignition timing of an internal combustion engine in accordance with engine requirements, including means for generating a first series of square-wave voltage pulses in synchronism with the engine revolutions, to provide a series of alternate first and second voltage levels; means for generating a second series of square-wave voltage pulses also in synchronism with the engine revolutions and at a fixed multiple of the first series of square-wave voltage pulses, so that the frequency of the second series of voltage pulses is greatly in excess of the frequency of the first series of voltage pulses; means for counting a number of the second series of voltage pulses from a predetermined point in relation to the first series of voltage pulses, the number of said pulses counted depending on the engine requirements; means for producing an output at the first voltage level from said counting means after said count has been completed; means for detecting the presence of both an output at the first voltage level from the first pulse generating means, and an output at the first level from the counting means in order to initiate the production of a spark for the combustion of the fuel; and means for continuously varying the count of the counting means, so as to advance and retard the ignition timing in accordance with the requirements of the engine.

The counting means is preferably a frequency divider.

Preferably, the means for varying the count of the frequency divider is a computer whose digital output is modified in accordance with digital information fed into it as regards the speed and/or load conditions on the engine.

The first and second series of generated pulses may be fast switched and current amplified by a trigger circuit comprising a plurality of cascaded transistors arranged to switch in inverse relation to one another so that at any one time at least one transistor is always fully saturated whilst its immediate neighbours are hard off.

The outputs from the first trigger and the counting means preferably operate a power transistor stage with one or more pre-amplifying stages to effect the production of the spark by interrupting the current through the primary winding of the ignition coil or delivering the desired quantity of fuel by energizing the solenoid of the fuel injector.

The power transistor stage may consist of a darlington pair having a commoned collector electrode, a zener diode and series resistor being connected between the commoned collectors and the base electrode of the first transistor of the pair. The collector electrode of the last transistor of the trigger is preferably connected to the base electrode of the first transistor of the darlington pair by way of a diode and iron cored inductor connected in series, the function of the latter being to slow down the switching rate of the darlington pair.

The present invention will now be described in greater detail by way of example with reference to the accompanying drawings, wherein:

FIG. 6 is a set of waveforms which assist in explaining the operation of the circuit shown in FIG. 3;

Figure 1:
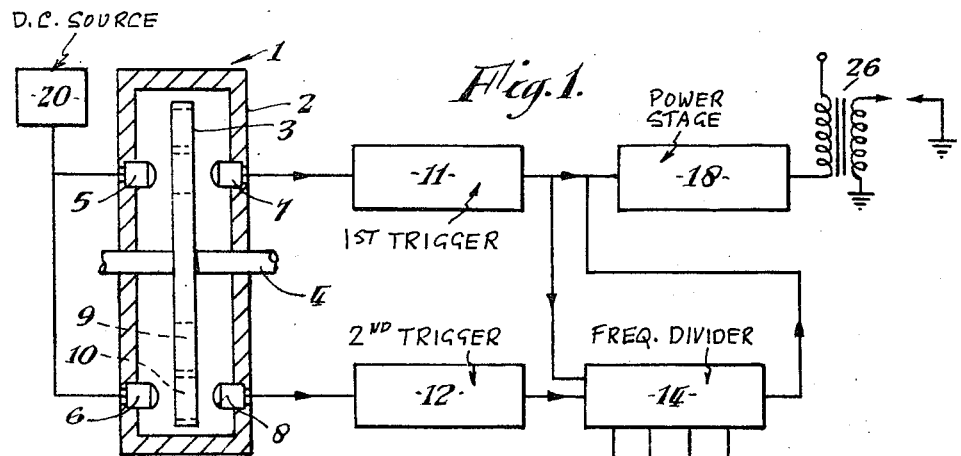
FIG. 1 is a diagram (partly in block form) of one form of advance and retard device for use with a spark ignition system of an internal combustion engine.
Figure 2:
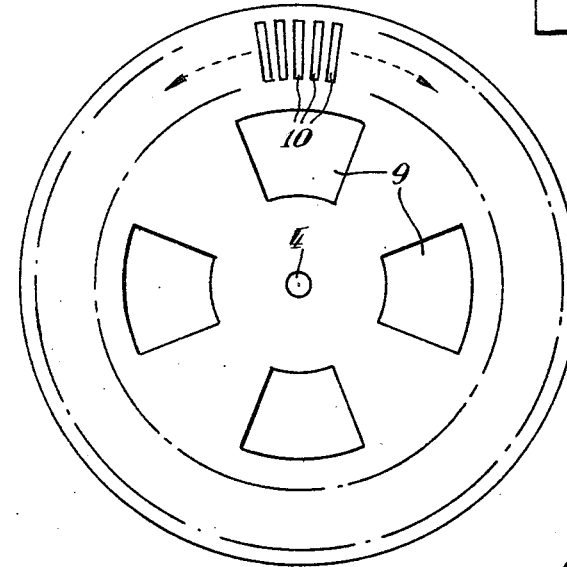
FIG. 2 is a front view of the disc shown in FIG. 1.
Figure 3:
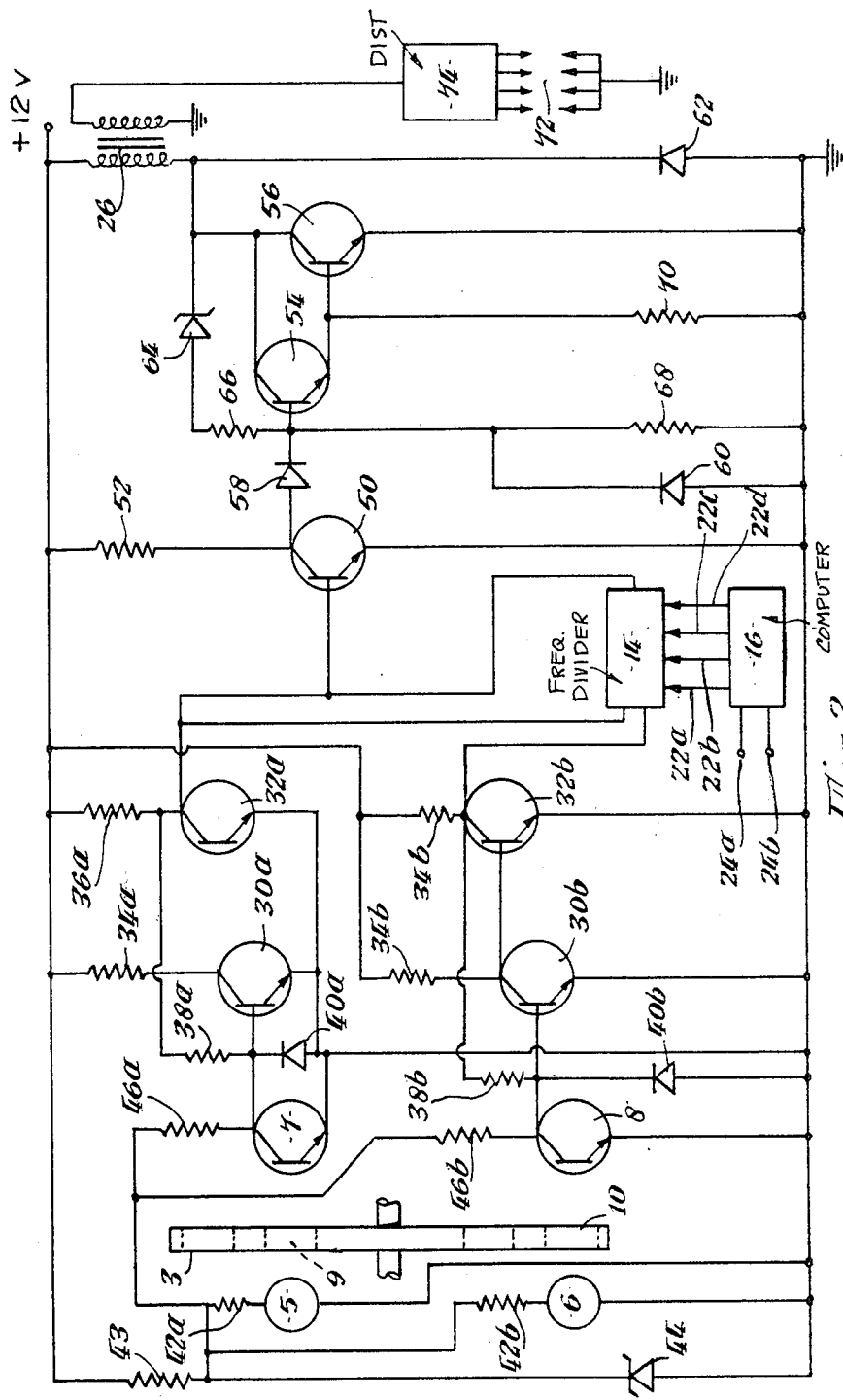
FIG. 3 is a detailed circuit diagram of the electronic advance and retard device shown in FIG. 1.

In the example relating to a spark ingition system for a four cylinder internal combustion engine shown in FIGS. 1 to 3, the device for achieving the electronic advance and retard of the timing of the spark, includes a radiation chopper device generally designated 1; a first fast inverse switching trigger circuit 11; a second fast inverse switching trigger circuit 12; a frequency divider 14; a computer 16; and an amplifier and power transistor stage 18.

The radiation chopper device 1 consists of a housing 2; a disc 3; a shaft 4 carrying the disc 3; infra-red radiation sources 5 and 6; and radiation detectors 7 and 8. The infra-red radiation sources 5 and 6 are preferably gallium arsenide lamps and the radiation detectors are preferably photo-transistors, all these elements being fixed to the housing 2. The shaft 4 is journalled in bearings (not shown) in the housing 2 and is driven at cam shaft speed of the engine.

The chopper disc 3 comprises two series of concentric apertures 9 and 10. There are four large apertures 9 in equi-spaced relation and a large number of small apertures or slits 10 (e.g. sixty eight). The apertures 9 permit infra-red radiation for the lamp 5 to reach the phototransistor 7, and the slits 10 permit infra-red radiation from the lamp 6 to reach the phototransistor 8. The lamps 5 and 6 are energized through a common stabilized voltage source 20.

The output from the respective phototransistors 7 and 8 is fed to the inputs of respective fast inverse switching triggers 11 and 12. The output of the second trigger 12 is fed to the frequency divider 14 which normally gives a 0 output, but which on completion of the count down set into it from the computer 16 gives a 1 output. The count set into the frequency divider 14 is controlled from the computer 16 by means of four output lines 22a to 22d, each of which is either at a high level of voltage to represent a 1 or at a low level of voltage to represent a 0 in accordance with the binary notation. The computer 16 receives at two inputs 24a and 24b information in digital form concerning the speed and load on the engine, this information being obtained from any known analogue type of measuring device and then converted into digital form so that the computer can calculate the count down necessary before the frequency divider 14 will give a 1 output so as to obtain the correct advance or retard of the ignition timing. In this example, the computer has a maximum count of sixteen. The amplifier and power transistor stage 18 controls the current flow through the primary winding of the ignition coil 26. When the outputs from the stages 11 and 14 are either 0 and 1 or 1 and 0 or 0 and 0 current flows through the primary winding of the ignition coil 26, but when both outputs are at the high level 1, then the current through the coil is interrupted, producing the collapse of the magnetic field and the resultant high secondary voltage necessary for the spark.

Referring now to FIG. 3, the first and second triggers 11 and 12 respectively include first transistors 30a and 30b, second transistors 32a and 32b, first collector load resistors 34a and 34b, second collector load resistors 36a and 36b, and feedback resistors 38a and 38b. The first and second transistors of each trigger are connected in cascade to switch in inverse relation to one another, so that when one is fully saturated (ON) the other is fully non-conductive (OFF). Also the output from the photo-transistors 7 and 8 is connected to the base electrodes of the respective first transistors 30a and 30b such that when the photo-transistors conduct, the first transistors switch off and vice versa. Respective diodes 40a and 40b are connected across the collector-emitter electrodes of the photo-transistors 7 and 8 to ensure clean switching of these elements.

The gallium arsenide lamps 5 and 6 are connected in series with respective resistors 42a and 42b and connected in parallel with one another across the +12 volt battery supply through a resistor 43. A zener diode 44 is connected across the paralleled gallium arsenide lamps 5 and 6 in order to provide a stabilized voltage. The voltage across the photo-transistors 7 and 8 is also stabilized by means of the zener diode 44 the photo-transistors being connected in series with respective resistors 46a and 46b.

The output from the collector electrode of the transistor 32a of the first trigger 11 is applied direct to the base electrode of a transistor 50 constituting the amplifier stage of the power transistor stage 18 and also to the set/reset input of the frequency divider 14. The output from the collector electrode of the transistor 32b of the second trigger 12 is applied indirectly to the base electrode of the transistor 50 through the frequency divider 14. The transistor 50 will conduct only if the outputs from the stages 11 and 14 are at the high level representing a 1. This transistor is thus normally "off" under all the three conditions except the double high when it becomes fully saturated. A resistor 52 is provided in series with its collector electrode.

The power transistor stage 18 also includes two power-transistors 54 and 56 connected as a Darlington pair; diodes 58, 60 and 62; a zener diode 64; resistors 66, 68 and 70. The power transistors 54 and 56 are fully protected by means of the zener diode 64 and the diode 62. The zener diode is arranged to conduct above a certain voltage level so that if there are any positive going transients induced in the circuit when the Darlington pair has switched off, these break down the zener diode 64 which conducts them through the resistor 66 to the base electrode of the power transistor 54. The Darlington pair is thus caused to turn on in a controlled manner for the duration of these transients so that there is no risk of either of the components of the Darlington pair being broken down in the event of high positive going voltage surges. Negative going transients which occur when the Darlington pair is switched off are conducted on earth via the diode 62. The purpose of the diode 58 is to prevent the voltage passed by the zener diode 64 from flowing to earth via the transistor 50.

The secondary winding of the ignition coil is connected to the spark plugs 72a to 72d via a distributor 74 in conventional manner.

Figure 4:
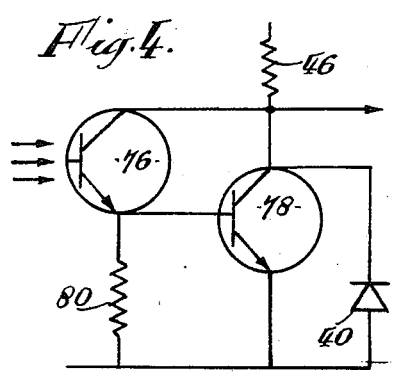
FIG. 4 is a first modified circuit arrangement of the photo-transistor of FIG. 3.
Figure 5:
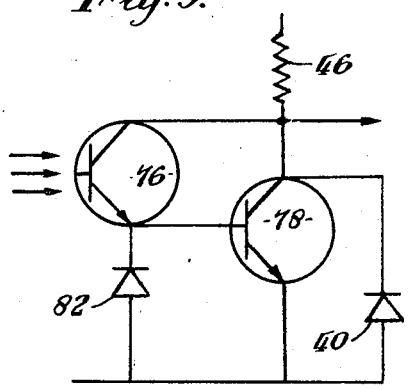
FIG. 5 is a second modified circuit arrangement of the photo-transistor of FIG. 3.

Instead of using a single photo-transistor 7 and 8, a Darlington pair may be used instead for both the elements 7 and 8. Two alternative circuit arrangements are illustrated in FIGS. 4 and 5. The circuit shown in both alternatives includes a Darlington pair comprising a photo-transistor 76 and an NPN transistor 78, the emitter electrode of the photo-transistor 76 being connected to the base electrode of the transistor 78. In each case the diode 40 is connected in parallel with the collector-emitter path of the transistor 78. In the first alternative form shown in FIG. 4, the emitter electrode of the photo-transistor 76 is connected to earth via a resistor 80, whereas in the second alternative form shown in FIG. 5, said emitter electrode is connected to earth via a diode 82. This latter arrangement provides even cleaner switching than the normall diode 40 as shown in FIG. 3.

The operation of the electronic advance and retard device will now be described in greater detail with the aid of the three waveforms shown in FIG. 6. As the disc 3 is rotated at crank shaft speed of the engine, the infra-red radiation from the lamps 5 and 6 impinges on the respective phototransistors 7 and 8 through the apertures 9 and slits 10. Accordingly, the photo-transistor 7 produces four current pulses per revolution of the disc 3, whilst the photo-transistor 8 produces a large number (e.g. 68) of pulses per revolution. The two triggers 11 and 12 fast switch and amplify these pulses to produce the waveforms (a) and (b) respectively. During the time t0 to t1 the photo-transistor 7 is energized by infra-red radiation and is therefore ON. The transistors 30a and 32a are respectively OFF and ON which means that the output from the first trigger is at the low level representing a 0. At t1, the infra-red radiation is cut off and the output of the first trigger becomes high representing a 1. This output is applied to both the frequency divider 14 and the transistor 50 of the stage 18. The frequency divider 14 now counts the pulses from the second trigger 12 according to the number set into it from the computer 16. The output of the frequency divider 14 is at the low level 0 from the time t0 up to and beyond the time t1 unless the computer calls for maximum advance of the ignition. Therefore when the trigger 11 produces a high level output, the power transistors are not switched because of the continued presence of a low level output from the frequency divider 14. In the example illustrated the frequency divider 14 is set to count down a total of six pulses before its output switches to the high level. Therefore at time t2 when the count of six has been completed, the output becomes high at the seventh pulse and the transistor 50 switches ON. This in turn switches the power transistor Darlington pair 54–56

OFF to switch off the flow of current in the primary winding of the ignition coil 26, and thus produce the spark through the high induced secondary voltage on the collapse of the field in the primary winding of the coil. At time $t3$, the output of the first trigger reverts to the low level which in turn resets the frequency divider which also reverts to the low level, as shown by waveform ($c$), these events both happening when the phototransistor 7 is again energized by infra-red radiation.

As and when the load and/or speed of the engine varies, the computer 16 re-calculates from the information fed to it, the new value for the count which is applied to the output thereof in digital form. The frequency divider 14 when started now counts fewer or more pulses before giving a high level output thus varying the timing of the ignition so as to achieve an advance or retard over the previous position. In the example illustrated the computer has a maximum digital output of sixteen so that the count of the frequency divider can vary from zero up to fifteen, zero being the count for maximum advance and fifteen for maximum retard.

The above described device thus provides the electronic control of the advance and retard of the spark in an ignition system, the relevant control being calculated in accordance with the speed and/or load on the engine.

What I claim and desire to secure by Letters Patent is:

1. An electronic device for controlling the advance and retard of the ignition timing of an internal combustion engine in accordance with engine requirements, including means for generating a first series of square-wave voltage pulses in synchronism with the engine revolutions to provide a series of alternate first and second voltage levels; means for generating a second series of square-wave voltage pulses also in synchronism with the engine revolutions and at a fixed multiple of the first series of square-wave voltage pulses, so that the frequency of the second series of voltage pulses is greatly in excess of the frequency of the first series of voltage pulses; means for counting a number of the second series of voltage pulses from a predetermined point in relation to the first series of voltage pulses, the number of said pulses counted depending on the engine requirements; means for producing an output at the first voltage level from said counting means after said count has been completed; means for detecting the presence of both an output at the first voltage level from the first pulse generating means, and an output at the first level from the counting means in order to initiate the production of a spark for the combustion of the fuel; and means for continuously varying the count of the counting means, so as to advance and retard the ignition timing in accordance with the requirements of the engine.

2. An electronic device according to claim 1, including an ignition coil having primary and secondary windings, wherein the counting means starts to count from a position equivalent to the maximum advance for any given running condition of the engine, a high voltage level output from the first pulse generating means, representing said first voltage level, initiating the start of the count, the counting means then counting down the predetermined number set therein before giving a high voltage level output, which together with the high voltage level output of the first pulse generating means, causes the de-energization of the primary winding of the ignition coil in order to induce a voltage in the secondary winding of the ignition coil sufficient to produce a spark.

3. An electronic device according to claim 1, wherein the counting means is a frequency divider.

4. An electronic device according to claim 3, wherein the means for varying the count of the frequency divider is a computer whose digital output is modified in accordance with digital innformation fed thereto as regards the speed and load conditions on the engine.

5. An electronic device according to claim 1, wherein the first and second series of generated pulses are each applied to respective trigger circuits, each trigger circuit comprising a plurality of cascaded transistors arranged to switch in inverse relation to one another so that at any one time one transistor is fully saturated while the immediately neighboring transistors are fully cut off.

6. An electronic device according to claim 1, including a power transistor stage; and a pre-amplifier stage the pre-amplifier stage being arranged to be turned on only in the presence of both a high voltage level pulse from the first pulse generating means and a high voltage level pulse from the counting means, the transistors of the pre-amplifier stage and the power transistor stage switching in inverse relation to one another.

7. An electronic device according to claim 6, wherein the power transistor stage comprises a darlington pair having a commoned collector electrode, a zener diode and series resistor being connected between the commoned collectors and the base electrode of the first transistor of the pair, the collector electrode of the transistor of the pre-amplifier stage being connected to the base electrode of the first transistor of the darlington pair by way of a diode.

8. An electronic device according to claim 1, including: an opaque disc driven in synchronism with the engine; 68 equi-spaced slits around the disc near the periphery thereof; $n$ equi-spaced apertures near the center of the disc, where $n$ is related to the number of cylinders in the engine; a pair of infra-red sources positioned on one side of the disc, in line with the slits and apertures; a pair of infra-red detectors positioned on the other side of the disc for generating said first and second square-wave voltage pulses as "high" and "lows" representing the first and second voltage levels respectively, the count of the counting means commencing at the instant that the infra-red radiation is cut off from the first detector.

9. An electronic device for controlling the advance and retard of the ignition timing of an $n$ cylinder internal combustion engine, having an ignition coil with primary and secondary windings, said device including an opaque disc driven in synchronism with the engine; a series of equi-spaced slits around the disc; $n$ equi-spaced apertures in the disc; a pair of infra-red radiation sources and a pair of infra-red radiation detectors arranged on opposite sides of the disc, the first element of each pair being arranged to cooperate with said $n$ apertures and the second element of each pair with the slits, one infra-red detector generating a first series of square-wave voltage pulses in synchronism with the engine revolutions, to provide a series of alternate first and second voltage levels; the other infra-red detector generating a second series of square-wave voltage pulses also in synchronism with the engine revolutions, and at a fixed multiple of the first series of square-wave voltage pulses, so that the frequency of the second series of voltage pulses is greatly in excess of the first series; a frequency divider circuit for counting the pulses generated from the second infra-red detector at a starting point determined when said respective first series of pulses change from the second to the first voltage level; a computer connected to receive analogue information from a pair of inputs regarding the requirements of the engine, and providing a corresponding digital output, in accordance with that information, for changing the count of the frequency divider, the frequency divider producing an output after the predetermined count; a transistorized power stage in series with the primary winding of the ignition coil, the power stage being rendered non-conductive at the instant when there is a first voltage level output from the frequency divider and the first detector thereby initiating the spark for ignition, the advance and retard of the ignition timing being continuously adjusted in accordance with engine requirements.

10. An electronic device according to claim 9, wherein the computer has four outputs which are connected to four inputs of the frequency divider circuit, the outputs from the computer representing either a 1 or a 0, whereby a digital count of sixteen can be fed into the frequency divider, in accordance with binary notation, said computer providing a digital output to the frequency divider in accordance with information fed thereto regarding the engine requirements, and digital output being continuously modified as these engine conditions change, so that the ignition timing is appropriately controlled in sixteen steps between maximum and minimum advance requirements.

\* \* \* \* \*